US011908493B2

(12) United States Patent
Lopez et al.

(10) Patent No.: US 11,908,493 B2
(45) Date of Patent: Feb. 20, 2024

(54) SINGLE CLIP SEGMENTATION OF MEDIA (71) Applicant: Instasize, Inc., Sandy, UT (US)

(72) Inventors: Hector Raul Lopez, South Jordan, UT (US); John William Fabela, Sandy, UT (US)

(73) Assignee: Instasize, In, Sandy, UT (US)

( * ) Notice: Subject to any disclaimer, the term of this patent is extended or adjusted under 35 U.S.C. 154(b) by 0 days.

(21) Appl. No.: 17/661,016

(22) Filed: Apr. 27, 2022

(65) Prior Publication Data
US 2022/0343952 A1 Oct. 27, 2022

Related U.S. Application Data (60) Provisional application No. 63/180,647, filed on Apr. 27, 2021.

(51) Int. Cl.
*G11B 27/34* (2006.01)
*G11B 27/031* (2006.01)
*G11B 27/00* (2006.01)
*G06F 3/0488* (2022.01)
*G06F 3/04842* (2022.01)
(Continued)

(52) U.S. Cl.
CPC .......... *G11B 27/34* (2013.01); *G06F 3/04855* (2013.01); *G11B 27/005* (2013.01); *G11B 27/031* (2013.01); *G11B 27/102* (2013.01); *G06F 3/0488* (2013.01); *G06F 3/04842* (2013.01); *G06F 2203/04804* (2013.01)

(58) Field of Classification Search
CPC ..... G11B 27/34; G11B 27/005; G11B 27/031; G11B 27/102; G06F 3/04855; G06F 3/04842; G06F 3/0488; G06F 2203/04804; G06F 3/0485
USPC ....................................................... 386/282
See application file for complete search history.

(56) References Cited

U.S. PATENT DOCUMENTS

| 6,587,123 | B2 * | 7/2003 | Ando ..................... G06F 16/738 |
| 10,139,992 | B2 * | 11/2018 | Wheeler ................. G06F 16/44 |
| 11,218,639 | B1 * | 1/2022 | Walker ................. H04N 23/633 |

(Continued)

OTHER PUBLICATIONS

Brown, Justin, Android Video Editing: Cyberlink PowerDirector Tutorial on Android, YouTube Video, Jul. 17, 2016, https://www.youtube.com/watch?v=V4Sd80roEfw.

(Continued)

*Primary Examiner* — Helen Shibru
(74) *Attorney, Agent, or Firm* — VLP Law Group LLP; Michel Bohn (57) ABSTRACT An example system may provide a graphical user interface displaying a timeline graphical element, where the timeline graphical element represents a timeline of a media clip, and a graphical current point indicator indicating a selected point on the timeline. The system may provide a marking graphical element that is selectable to record a start point or an end point of a segment of the certain media clip. The system may receive a first user input scrubbing the timeline graphical element horizontally, and it may receive a second user input indicating a user interaction with the marking graphical element. The system may determine a start point and an end point of each of a plurality of segments of the timeline graphical element corresponding to the certain media clip based on the second user input and update the graphical user interface based on the determination.

20 Claims, 9 Drawing Sheets (51) Int. Cl.
G06F 3/04855 (2022.01)
G11B 27/10 (2006.01)

(56) References Cited

U.S. PATENT DOCUMENTS

| | | | | |
|---|---|---|---|---|
| 11,348,616 | B2* | 5/2022 | Toff | G11B 27/031 |
| 11,644,950 | B2* | 5/2023 | Wheeler | G06F 3/0485 |
| | | | | 715/719 |
| 11,676,316 | B1* | 6/2023 | Lopez | G06F 16/176 |
| | | | | 345/619 |
| 2008/0244410 | A1* | 10/2008 | Schormann | G06F 3/04886 |
| | | | | 715/723 |

OTHER PUBLICATIONS

PowerDirector University, How to Quickly Split and Trim Video: PowerDirector App, YouTube Video, Sep. 29, 2020, https://www.youtube.com/watch?v=iRcXSiweTO4.
Corel Discovery Center, How to Split, Cut and Trim Video in VideoStudio, YouTube Video, Apr. 16, 2019, https://www.youtube.com/watch?v=szNgUvrcLXU.
Power Director Essentials from the Sharper Turtle, PowerDirector—How to edit clips with trim and multi-trim, YouTube Video, Apr. 21, 2017, https://www.youtube.com/watch?v=AYFENsBZwOM.
Corel Discovery Center, Using the Multi Trim Feature in Corel VideoStudio X4, YouTube Video, Apr. 13, 2012, https://www.youtube.com/watch?v=6Y8sNyXpcHg.
Videostudio—2018, Trimming video into multiple clips, retrieved Apr. 27, 2022 from help.corel.com/videostudio/v21/en/official-help/index.html#/page/videostudio-2018/h2-trimming-video.html.

* cited by examiner

Update timeline graphical element to graphically indicate plurality of segments of certain media clip based on second user input(s)
114

Determine start point and endpoint of each of plurality of segments based on second input(s)
116

Generate set of individual media clips based on determined start point and end point of each of plurality of segments
118

Receive third user input(s) interacting with graphical elements depicting set of individual media clips on graphical user interface
120

Generate content item using set of individual media clips and third user input(s)
122

SINGLE CLIP SEGMENTATION OF MEDIA

BACKGROUND

The present specification generally relates to a technology for efficiently generating segments of a media clip.

Previous solutions for generating segments of media clips required duplication of media, such as videos, several times in order to extract multiple clips from the same video. This was cumbersome, not user-friendly, and required significant computation, memory, and computer storage resources to perform. Other solutions were not well suited for touchscreens or limited size displays, such as those on smartphone or wearable electronic devices. Accordingly, an improved solution for segmenting media is needed.

SUMMARY

An improved image resizing using seam carving system can be configured to perform particular operations or actions by virtue of having software, firmware, hardware, or a combination of them installed on the system that in operation causes or cause the system to perform the actions. One general aspect of the system includes a method that includes: providing a graphical user interface for display on a client device, the graphical user interface including a time-specific graphical representation of a certain media clip, the certain media clip including a video; providing a timeline graphical element on the graphical user interface, the timeline graphical element being located below a center of the time-specific graphical representation of the certain media clip, the timeline graphical element graphically representing a timeline including the certain media clip, the graphical user interface including a graphical current point indicator indicating a current point on the timeline, the current point indicating a selected point of the certain media clip; receiving one or more first user inputs on the graphical user interface moving the timeline graphical element and, in response to the one or more first user inputs, automatically updating the time-specific graphical representation of the certain media clip to correspond to the current point on the timeline based on a position of the timeline graphical element on the graphical user interface; and providing one or more marking graphical elements proximate to the timeline graphical element, the one or more marking graphical elements being selectable to mark a start point or an end point of a segment of the certain media clip.

In some implementations, the method may include: receiving one or more second user inputs indicating a user interaction with one or more of the timeline graphical element and the one or more marking graphical elements on the graphical user interface; updating the timeline graphical element to graphically indicate a plurality of segments of the certain media clip based on the one or more second user inputs; determining a start point and an end point of each of the plurality of segments of the certain media clip based on the one or more second user inputs; generating a set of individual media clips based on the determined start point and the determined end point of each of the plurality of segments of the certain media clip, each of the set of individual media clips including a portion of the certain media clip; receiving one or more third user inputs interacting with graphical elements depicting the set of individual media clips on the graphical user interface; and generating a content item using the set of individual media clips and the one or more third user inputs.

Other embodiments of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

The present specification generally relates to technology for efficiently generating segments of a media clip, for instance the present technology allows clips or segments to be extracted from a larger media clip in an efficient manner, especially where the clips are being extracted using a mobile-computing device, such as a smartphone, with limited screen size, input precision (e.g., a touch screen), and processing and memory capabilities. For example, the technology provides several advantages over previous implementations especially when applied on a client device with limited screen size and/or touchscreen input, which typically significantly interferes with the interaction with many small icons or other elements common to video editing software.

The features and advantages described herein are not all-inclusive and many additional features and advantages will be apparent to a person of ordinary skill in the art in view of the figures and description. Also, it should be noted that the language used in the specification has been selected for readability and instructional purposes and not to limit the scope of the inventive subject matter.

With reference to the figures, reference numbers may be used to refer to components found in any of the figures, regardless of whether those reference numbers are shown in the figures being described. Further, where a reference number includes a letter referring to one of multiple similar components (e.g., component 000a, 000b, and 000n), the reference number may be used without the letter to refer to one or all of the similar components.

Figure 1A:
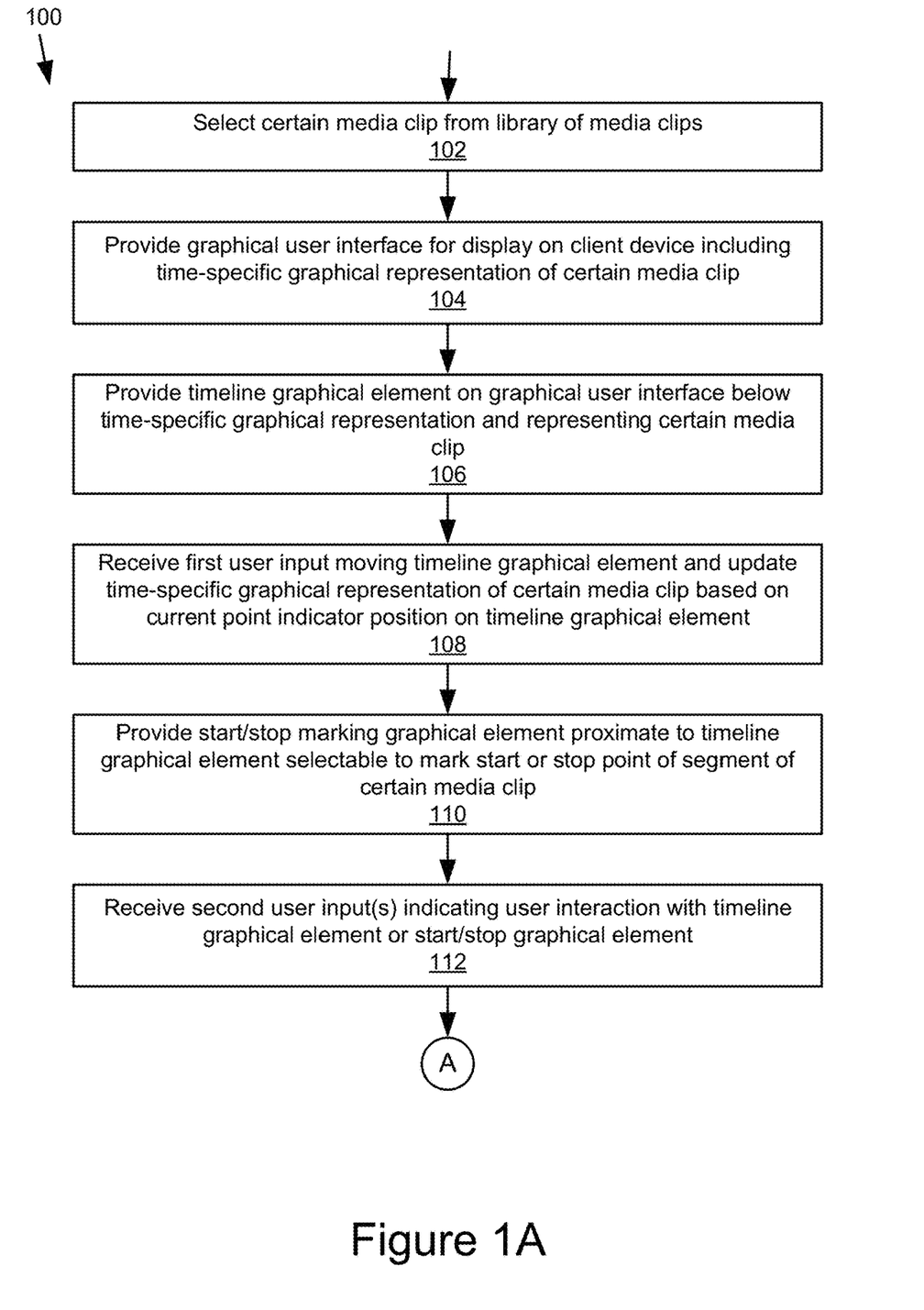
FIGS. 1A and 1B illustrate an example method for providing media clip segmentation.
Figure 1B:
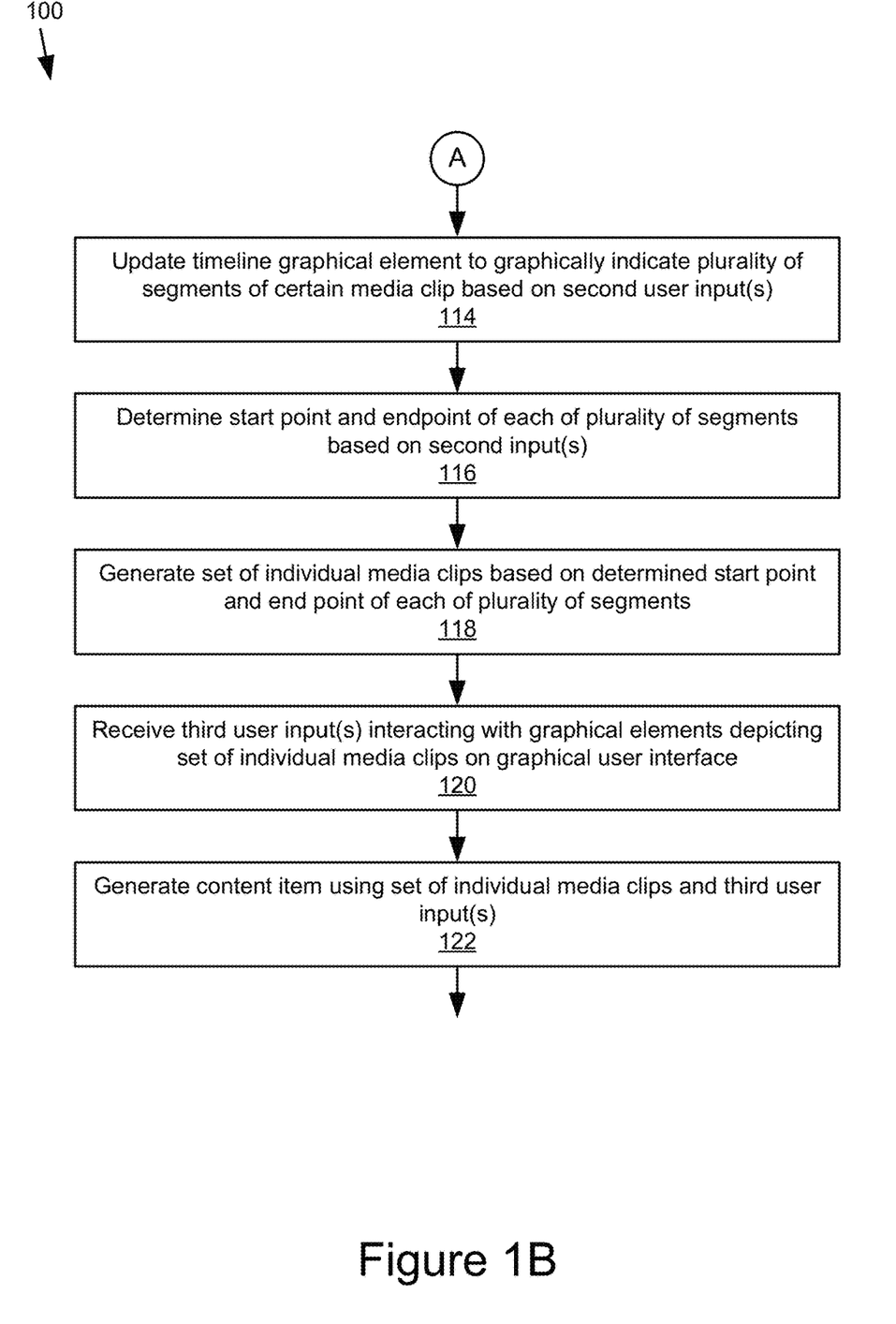

FIGS. 1A and 1B illustrate an example method 100 for providing media clip segmentation. In some implementations, the method 100 may be performed by a management server 398, a design application 390, or another device that are implemented on one or more computing devices (e.g., 320 or 400), for example, as described in reference to FIGS.

Figure 3:
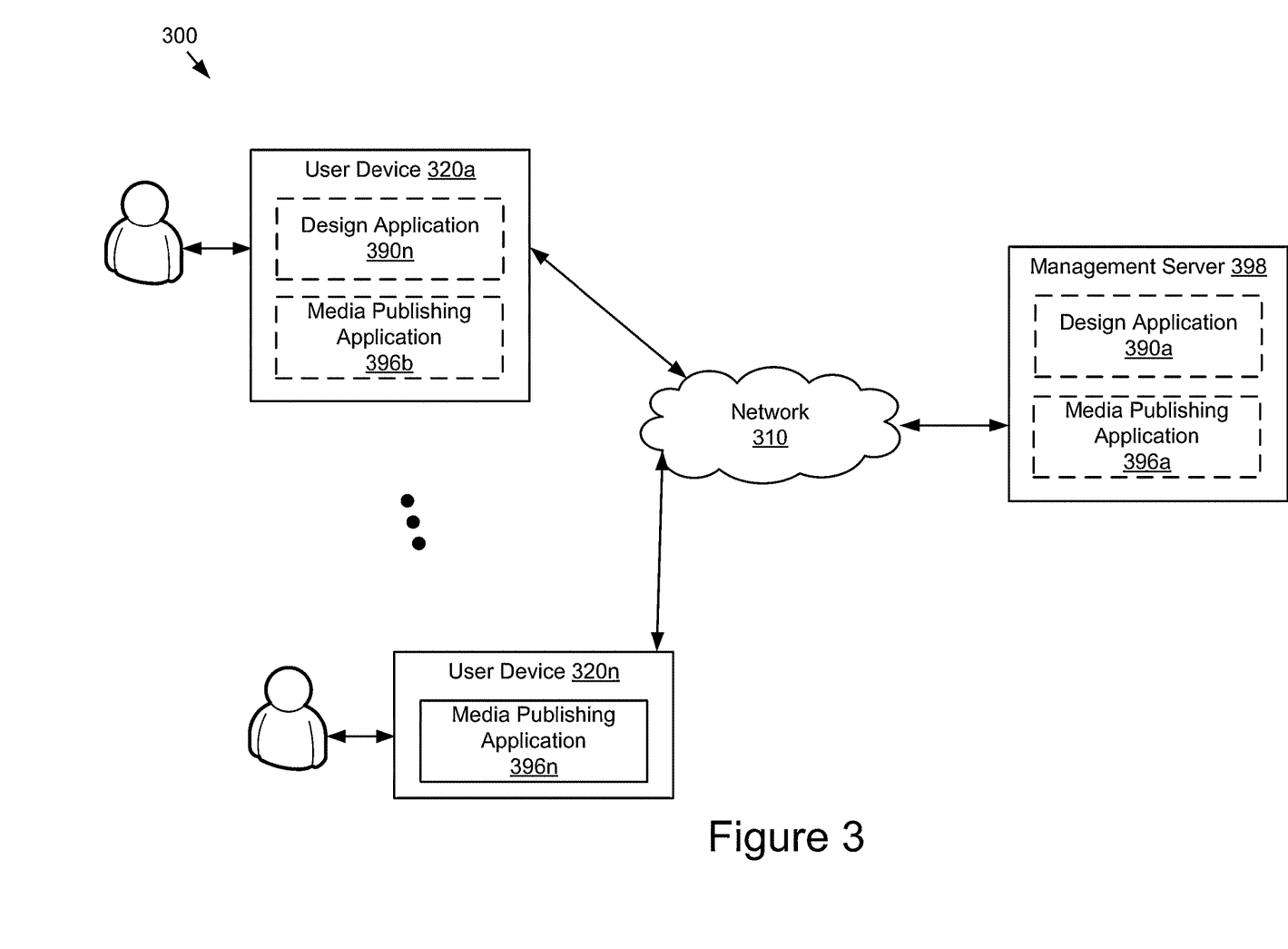
FIG. 3 illustrates an example network diagram of a computing system.
Figure 4:
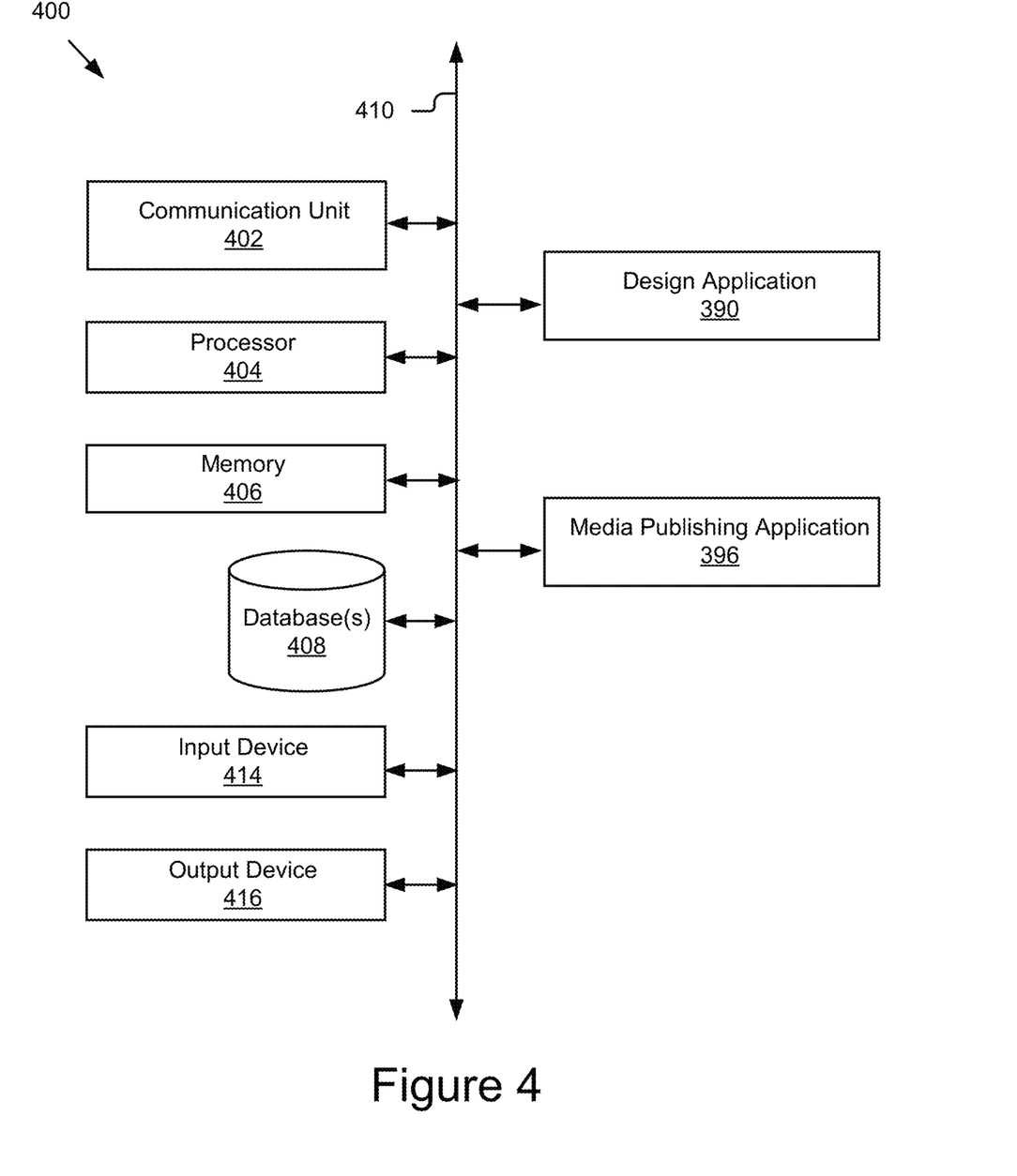
FIG. 4 illustrates an example computing device, which may perform the operations of the design application or media publishing application.

3 and 4. It should be understood that each of these components may fully or partially perform the functionalities described herein and that their functionalities may be condensed to fewer devices or distributed differently.

Figure 2A:
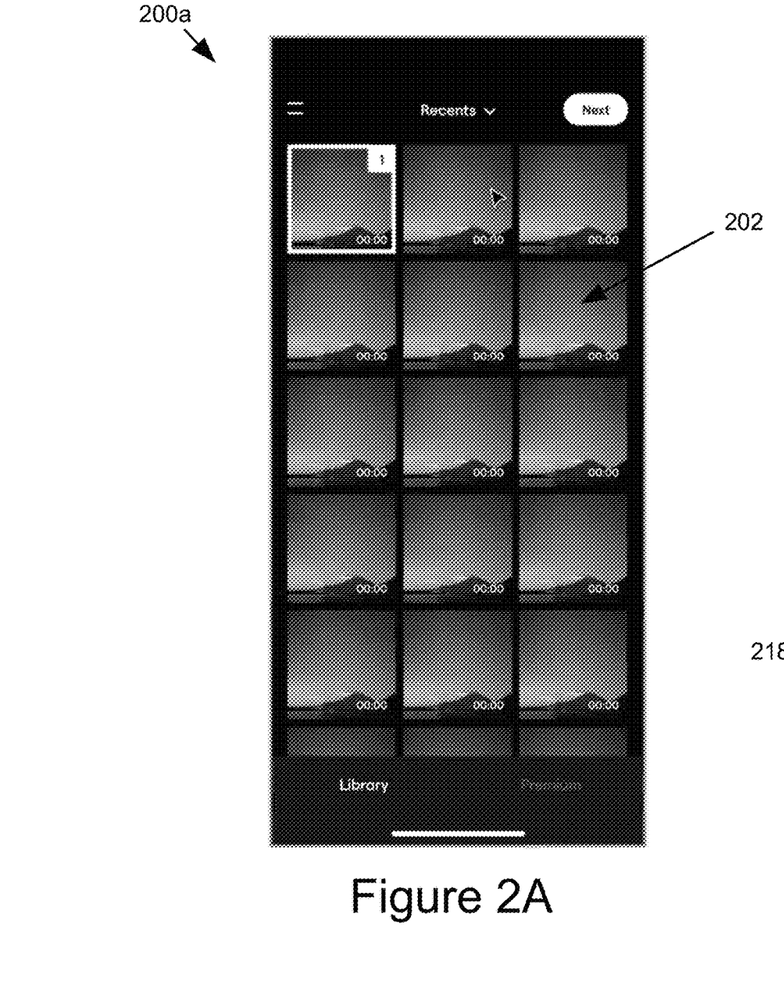
FIG. 2A illustrates an example grid layout in a graphical user interface where the grid displays the library of media clips.

In some implementations, at 102, an instance of a design application 390 may select a certain media clip from a library of media clips. For instance, the design application 390 may retrieve and/or display a library of media (e.g., images, audio, video, etc.) from which a certain clip may be selected. For example, the design application 390 may determine a set of media clips associated with a user (e.g., present on the user's client device or in a cloud database). The design application 390 may provide (e.g., generate and/or render for display via a display device) graphical elements depicting the set of media clips on a graphical user interface displayed on the client device. For example, FIG. 2A illustrates a grid layout 202 in a graphical user interface 200a where the grid displays the library of media clips. The graphical elements may represent previews, lengths, or other information pertaining to the clips. In some implementations, the design application 390 may also show other media that may be purchased, downloaded, or otherwise accessed, for example for adding to a timeline. For instance, one or multiple media clips, whether owned by the user or provided by a third party, may be selected and added to a timeline. In some instances, the selected media clips may be combined into a single media clip and/or timeline.

In some implementations, in response to receiving a selection of a certain graphical representation of a certain media clip, the design application 390 may add the certain media clip to the timeline, such that the timeline (described in further detail below) includes one or more media clips.

Figure 2B:
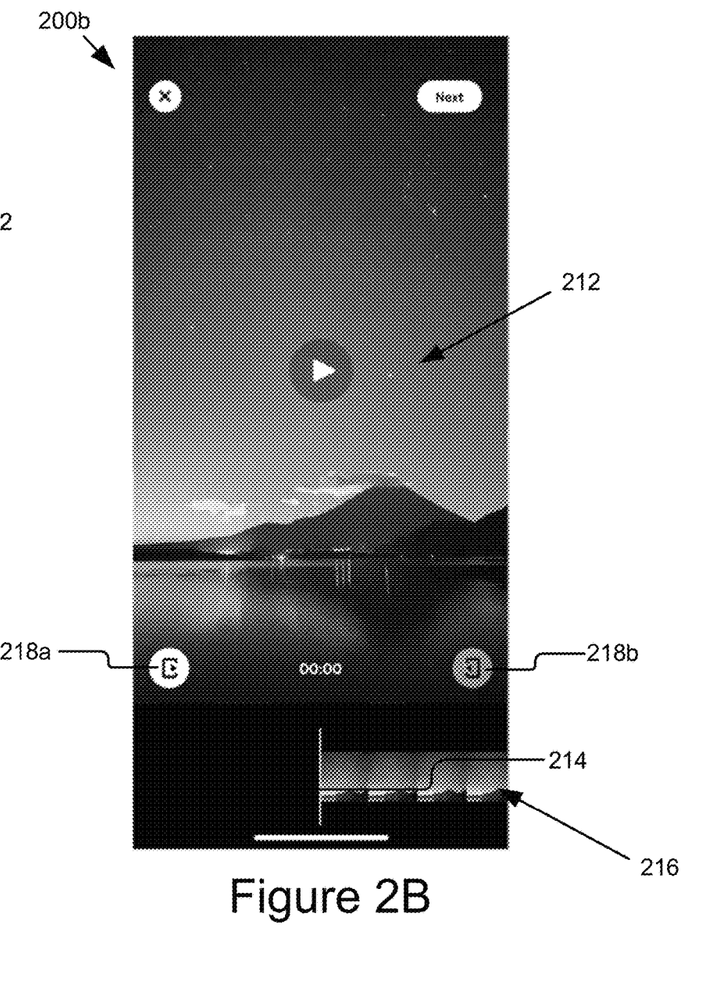
FIGS. 2B-2H illustrate example graphical user interfaces in which multiple segments are selected from a timeline for a single media clip.

In some implementations, at 104, the design application 390 may provide a graphical user interface for display on the client device that includes include a time-specific graphical representation 212 of a certain media clip (e.g., the clip selected in 102), such as a video. For instance, as illustrated in at least FIG. 2B, the graphical user interface 200b may include a time-specific graphical representation 212, which may allow playback of a media clip, for example, in response to selecting a graphical element that is user-selectable for playback, such as a play or other button. In some instances, a playback position (e.g., a specific point or frame in a video) may be based on a current point indicator 214, as described in further detail below. The display of the time-specific representation 212 may illustrate an image or previous of the current, selected point (e.g., corresponding to a position of the current point indicator 214 on the timeline graphical element 216) of the media clip. For example, scrubbing a position of the timeline graphical element 216 across the graphical user interface or the current point indicator 214 across the timeline graphical element 216 may cause the design application 390 to display a corresponding previous or point of the media clip in the time-specific graphical representation 212.

In some implementations, at 106, the design application 390 may provide a timeline graphical element 216 on the graphical user interface. For instance, the timeline graphical element 216 may be rendered to be located below a center (e.g., on a bottom half) of the time-specific graphical representation 212 of the certain media clip, such that it may be more easily scrolled/scrubbed/interacted with, for example, on a touch screen device, such as a smartphone. For instance, by rendering the timeline graphical element 216 near the bottom of the display of the client device, a user may use their thumbs to move or interact with the timeline without blocking the screen or moving their hands while holding the client device.

The timeline graphical element 216 may graphically represent the timeline including the certain media clip (or, in some implementations, multiple media clips). In some implementations, the timeline graphical element 216 may display a plurality of graphical previews (e.g., images from moments in a video) of the certain media clip, which may be automatically selected by the design application 390 based on timestamps, certain time intervals, or events (e.g., a change of scenery, color, action, or subject, such as a face, detected in the media clip by the design application 390).

In some implementations, the timeline graphical element 216 may be horizontally scrollable in response to user inputs such that the graphical current point indicator 214 indicates varying points on the timeline graphical element 216 based on the position of the timeline graphical element 216 (e.g., relative to the current point indicator 214 or a position on the graphical user interface). The current point indicator 214 may indicate a current point on the timeline that is being displayed on the time-specific graphical representation 212 or selected for purposes of the start/stop marking graphical element (referred to as start/stop or marking herein) described below. For instance, the timeline graphical element 216 may be scrolled or scrubbed across the graphical user interface past the current point indicator 214 to change the frame being displayed, selected, or marked, as illustrated and described in reference to FIGS. 2B-2H.

In some implementations, at 108, the design application 390 may receive a user input via the graphical user interface using an input device, such as a touch-sensitive display, that moves the timeline graphical element 216 and, in response to the user input, may automatically update the time-specific graphical representation 212 of the certain media clip to correspond to the current (e.g., selected by the current point indicator 214) point on the timeline based on a position of the timeline graphical element 216 on the graphical user interface. For example, a frame may be played back or displayed corresponding to the position of the timeline graphical element 216 respective to the current point indicator 214. For example, the timeline graphical element 216 has been scrolled or scrubbed horizontally between the illustration of FIGS. 2C and 2D.

In some implementations, at 110, the design application 390 may provide (e.g., generate and/or render for display) one or more start/stop graphical elements 218 proximate to the timeline graphical element 216. The one or more start/stop graphical elements 218 may be selectable to mark a start point and/or an end point of a segment of the certain media clip. In some instances, a single start/stop graphical element 218 may be provided as a button that may both start and stop selection of a segment of the media clip. In some instances, multiple (e.g., two) start/stop graphical elements 218 may be provided as multiple buttons, for example, as a start button 218a to start selection and a stop button 218b to stop selection of the segment(s).

In some implementations, the start/stop graphical element(s) 218 includes a graphical button that changes its operation based on context of the user inputs. For instance, the design application 390 may change the operation of the start/stop graphical element(s) 218 by changing its/their visual appearance (e.g., to gray out, display, hide, disable, enable, or highlight, etc.) based on context. For example, while two start/stop graphical elements 218 are illustrated in some examples herein, a single start/stop graphical element (e.g., the left or right instance, or an instance at another location proximate to the timeline graphical element 216) may be provided on the graphical user interface by the design application 390.

In some instances, the appearance or functionality of the start/stop graphical element(s) 218 may be changed between a start button and a stop button based on the context. For example, upon selection of a start button, the design application 390 may mark (e.g., display a graphical indication of a start point and record a time stamp of the point in the media clip) the start point or frame of a segment of the media clip and change the start button to a stop button (or remove the start button and display a stop button), which may function to select a stop point of the segment. For example, FIGS. 2B-2H illustrate the start/stop graphical element(s) 218 changing their visual appearance, although other implementations are possible and contemplated herein.

For example, the design application 390 may gray out, remove, or otherwise change a start and/or stop marking graphical element 218 based on whether the functionality is available. For instance, if a start marking graphical element is selected so a start point of the media clip is selected, the design application 390 may gray out the start marking graphical element to indicate (and/or disallow further selection) that the start point has been selected. Similarly, when an end point of a segment of the media clip is selected, the design application 390 may change, remove, or grey out the stop marking graphical element and display a start marking graphical element.

In some instances, the context based upon which the design application 390 may change the appearance and/or function of the start/stop graphical element(s) 218 may include, but is not limited to, the graphical current point indicator 214 being at a beginning of the timeline (e.g., in which instance only a start button, in appearance or function, may be shown/selected); the graphical current point indicator 214 being at an end of the timeline (e.g., in which instance only a stop button, in appearance or function, may be shown/selected); the start/stop graphical element 218 having been selected to indicate a start point or a stop point of a certain segment of the certain media clip (e.g., as described above); and a total duration of the plurality of segments of the certain media clip exceeding a threshold (e.g., if the design application 390 determines that the total duration of selected segments exceeds a defined threshold, it may prevent a segment from being ended after that threshold).

In some instances, whether the segment is at a start or stop/end point may depend on whether the selected points are before or after one another in the timeline. For example, the design application 390 may change the appearance, function, or simply mark stop/start points based on which comes first sequentially in a timeline and not based on which button is pressed first. For example, where a user selects a later point in the timeline and then scrolls backward to select an earlier point, the earlier point in the timeline would be a start point and the later point would be a stop point despite the order in which they are selected. The design application 390 may change the appearance or function of the start/stop elements or graphical representation of segments consistent with these functions.

In some implementations, at 112, the design application 390 may receive user inputs indicating a user interaction with one or more of the timeline graphical element 216 and the start/stop graphical element(s) 218 on the graphical user interface. For instance, the design application 390 may receive inputs in which the timeline graphical element 216 is scrolled and the start/stop graphical elements 218 are used to select one or more segments of the timeline. In some implementations, the user inputs may include touch inputs into the client device (e.g., a limited size display device, such as a touchscreen smartphone) where the touch inputs include a horizontal scrub of the timeline graphical element 216 to move the timeline graphical element 216 or the previews displayed thereon across the current point indicator 214. For example, the inputs moving the timeline graphical element 216, selection of start/stop element(s), and/or selection of segments on the timeline (e.g., of a certain media clip or multiple media clips), are illustrated in FIGS. 2B-2H.

In some implementations, at 114, the design application 390 may update the timeline graphical element 216 to graphically indicate a plurality of segments of the certain media clip based on the one or more user inputs. Updating the timeline graphical element 216 may include graphically indicating a plurality of segments of the certain media clip based on the one or more second user inputs. For example, the design application 390 may overlay a transparent highlighted area 222 over the timeline graphical element 216 at points encompassing the start point and the stop points of each of the plurality of segments of the certain media clip. In some implementations, the design application 390 may additionally or alternatively outline each of the areas of the segment(s) with a box. Examples of highlighting and outline of segments are illustrated in FIGS. 2C-2H. As illustrated, when the timeline graphical element 216 is scrolled, the highlighting, outlining, or other segment indicators may move with the timeline.

In some implementations, at 116, the design application 390 may determine a start point and an end point of each of the plurality of segments of the certain media clip based on the inputs. For instance, one or more frames or timestamps in the timeline or certain media clip may be determined based on whether a start or end point is selected (e.g., based on the start/stop graphical element 218), a position of the timeline graphical element 216 relative to the current point indicator 214, or other factors. The design application 390 may store the start and/or stop points (e.g., frames, times, timestamps, etc.) of each of the selected portions or segments of the timeline or certain media clip in a computer-accessible memory, for example, in connection with a current project and/or user.

Figures 2C, 2D:
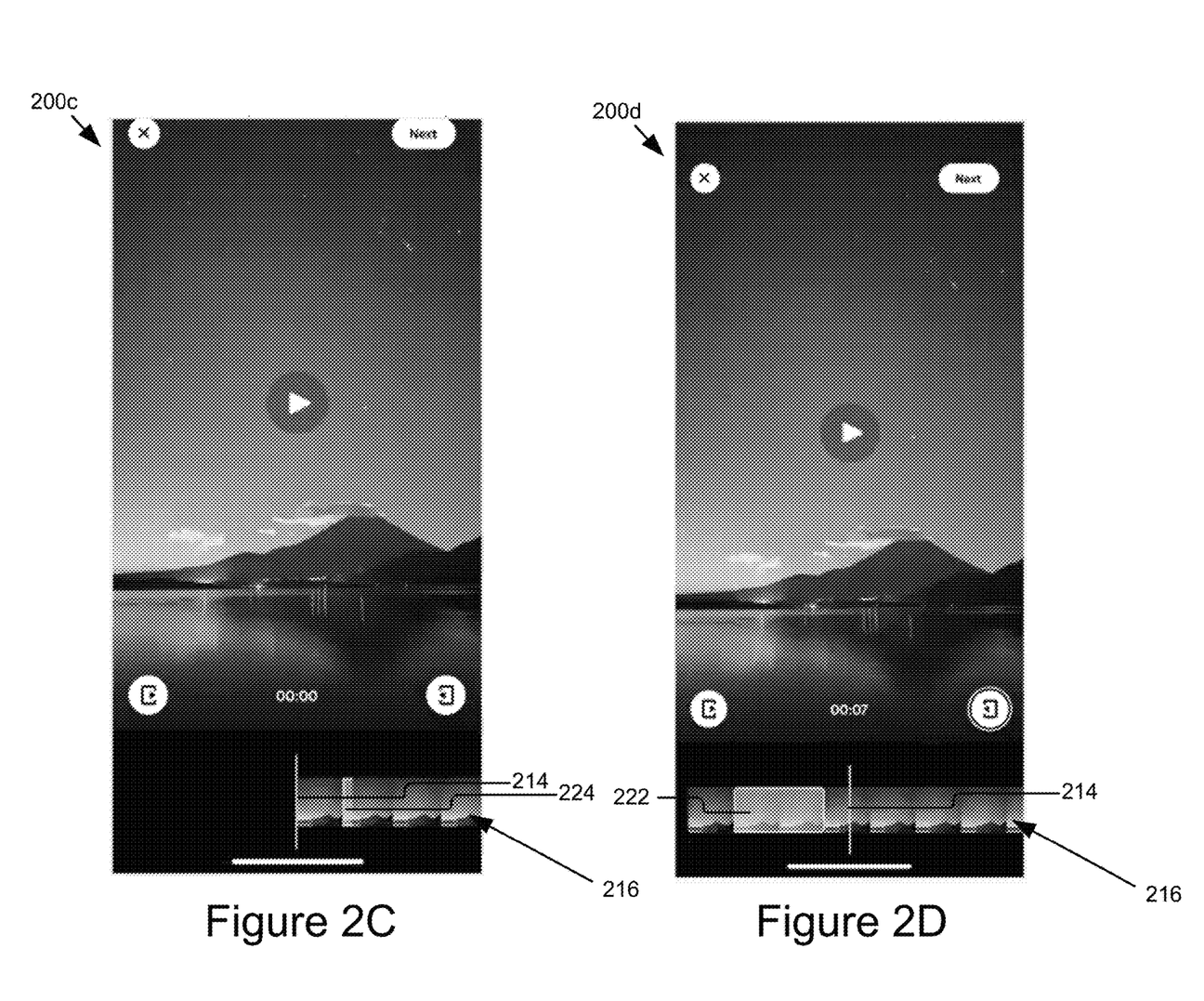

For example, FIG. 2C illustrates an example graphical user interface 200c in which the timeline graphical element 216 includes a highlighted portion 224 indicating a first segment selected in the timeline and the current point indicator 214 at the beginning of the timeline. As noted elsewhere herein, if a start point is selected and then the end point is selected before the start point in the timeline, the design application 390 may automatically reset the earlier point in the timeline to be the start point and the later point to be an end point.

FIG. 2D illustrates an example graphical user interface 200d in which the design application 390 has overlaid a transparent highlighted area 222 over the timeline graphical element 216 at points encompassing the start point and the stop points of each of the plurality of segments of the certain media clip, as noted above. Additionally, as illustrated in FIG. 2D, the current point indicator 214 may be positioned (e.g., by sliding the timeline graphical element 216 horizontally) at a new point in the timeline to select a new start point for a second segment of the clip. This configuration is beneficial for touch screen displays where multiple separate segment flows or timelines (e.g., for separately displayed segments) would take up too much space and would be difficult to interact with (e.g., because touch inputs lack selection precision).

Figures 2E, 2F:
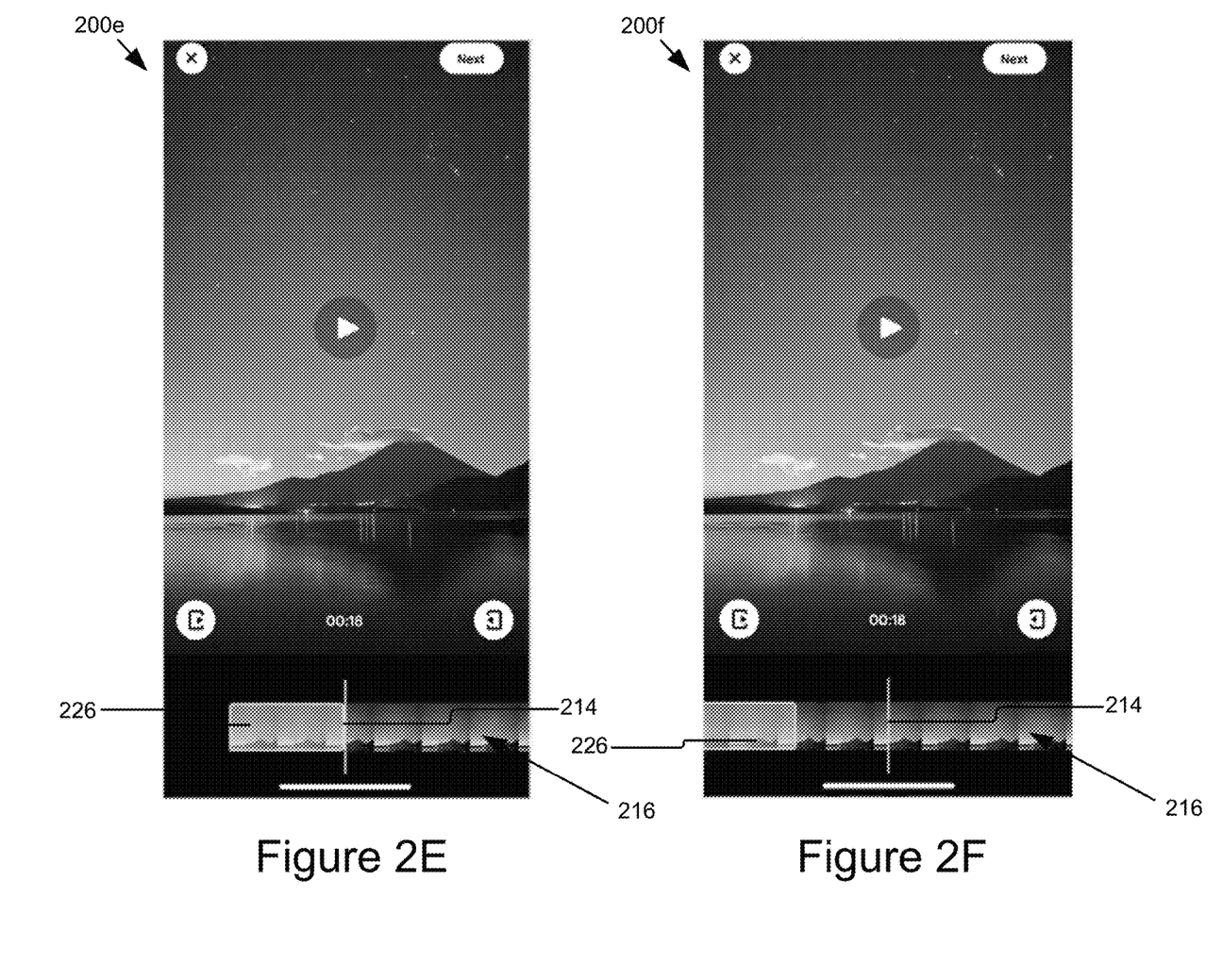

FIG. 2E illustrates an example graphical user interface 200e in which a portion 226 of the timeline has been selected (e.g., at a starting point of the media clip in the timeline) and the highlighted graphical area is automatically displayed extending from the selected start point to the current point indicator 214 on the timeline graphical element 216.

In some implementations, when an end point is selected, it is automatically set at a point and timestamp based on the current point indicator 214 and the position of the timeline graphical element 216 (e.g., a point of the timeline at which the current point indicator 214 is positioned). For example, FIG. 2F illustrates the example graphical user interface 200f in which an end point is selected and the timeline graphical element 216 has moved horizontally to the left (e.g., in response to user input). Accordingly, as the timeline moves, the highlighted portion 226 may move with it thereby indicating the portion of the timeline that is selected for a clip segment. Additionally, a new point on the timeline corresponding to the current point indicator 214 may be selected as a new starting point of a new segment to be clipped from the media clip.

Although not illustrated in FIGS. 2E and 2F, as the current point indicator 214 is selecting different points on the timeline, corresponding previews (e.g., images, videos, audio, etc.) may be updated in the time-specific representation 212. Similarly, a timestamp of the current point in the media clip or timeline may be displayed, updated, and/or stored based on interaction with the various graphical elements, as noted elsewhere herein.

Figure 2G:
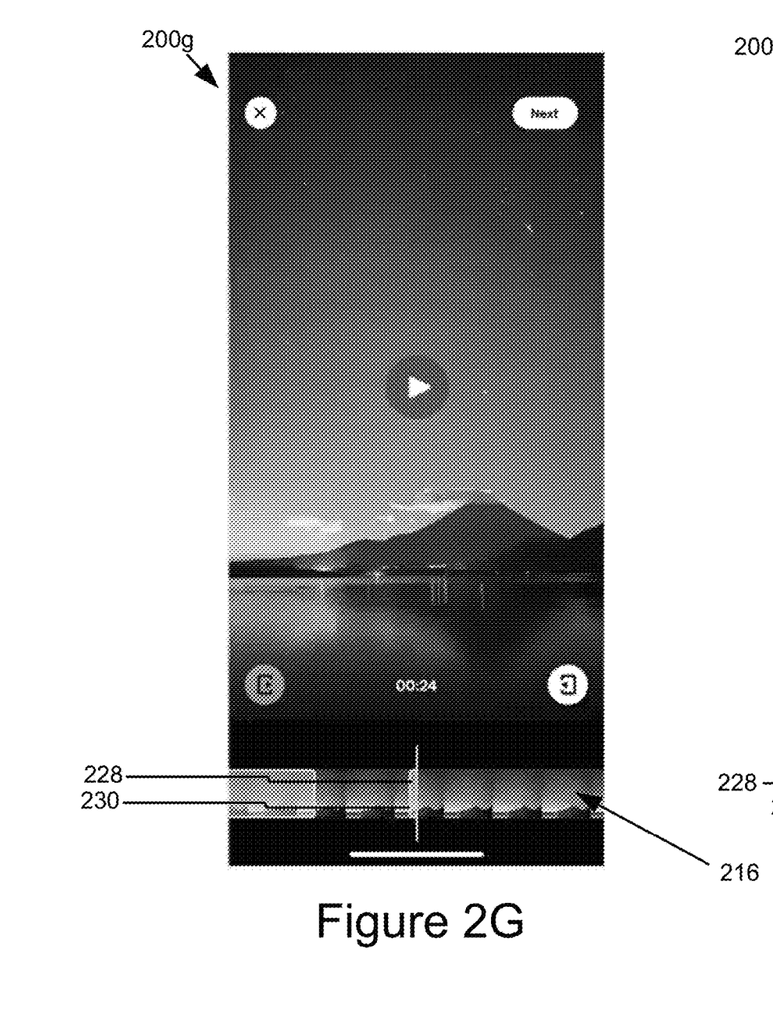
Figure 2H:
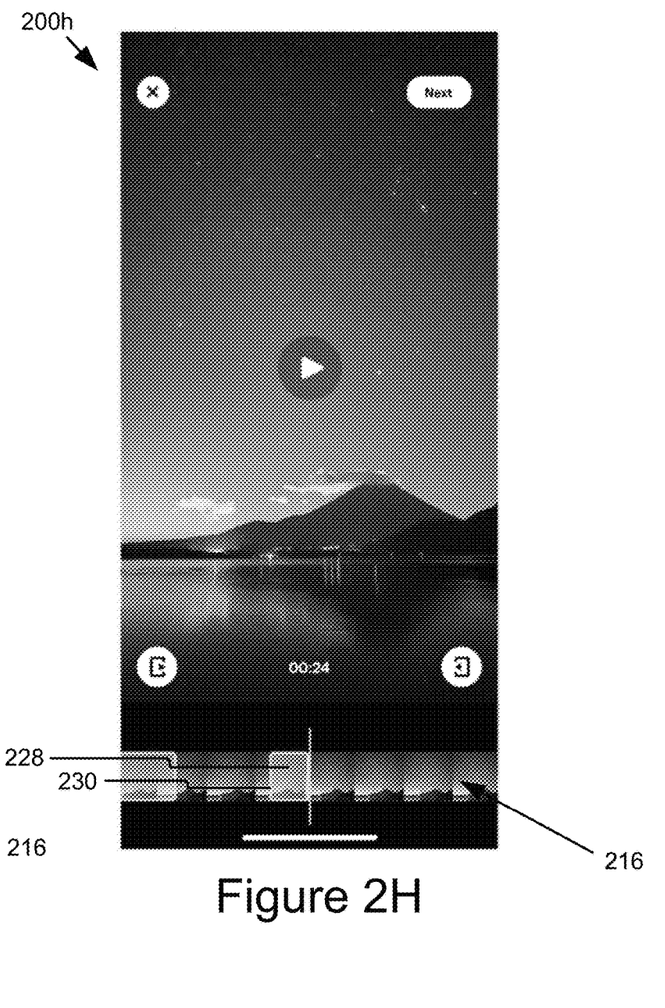

In some implementations, as illustrated in the example of FIG. 2G, the graphical user interface 200g may be updated to illustrate a second highlighted portion 228, which is selected at a starting point and extending to the current graphical indicator 214 (e.g., until the highlighting is severed/detached from the current graphical indicator 214 position when an end point is selected). For instance, as illustrated in FIG. 2G, a second starting point 230 has been selected (e.g., using the start/stop graphical element(s) 218) and timeline graphical element 216 has moved sideways thereby extending the second highlighted portion 228 along the timeline graphical element 216. For example, the example of FIG. 2H, the timeline graphical element 216 has moved to the left and the first and second highlighted areas with it in the example graphical user interface 200h. For example, the second highlighted portion 228 may be extended to be displayed with a right side matching a position of with the current point indicator 214.

As described above and illustrated, the one or more start/stop marking elements 218 may change state, functionality, or appearance based on context. For instance, a marking element 218 may be grayed out, displayed/hidden, overlayed, or moved depending on whether it is activated. The design application 390 may activate or inactivate the marking element 218 to assist a user in determining whether its next, current, or previous operation is to start or stop a new segment. For instance, if no segment has been started, the design application 390 may display or activate a start marking graphical element if a start point has not been selected (e.g., since a stop point was activated on another segment) but may deactivate a start marking graphical element and activate (e.g., replace, emphasize, move, display) a stop marking graphical element. Other contexts and changes to the marking graphical elements 218 are described elsewhere herein.

It should be noted that although graphical user interfaces 200a . . . 200i are described, they may be the same, dynamic graphical user interface, they may be a sequence of graphical user interfaces, or they may represent alternative implementations.

In some implementations, at 118, the design application 390 may generate a set of individual media clips based on the determined start point and end point of each of the plurality of segments of the certain media clip. For example, the certain media clip (and/or other media clips in the timeline) may be automatically split or duplicated to create individual media clips corresponding to each of the selected segments. In some implementations, the design application 390 may automatically clip and save individual media clips for each segment. This is highly beneficial over methods where a user duplicates a certain media clip repeatedly and crops the start or stop of each duplicated clip repeatedly.

Figure 2I:
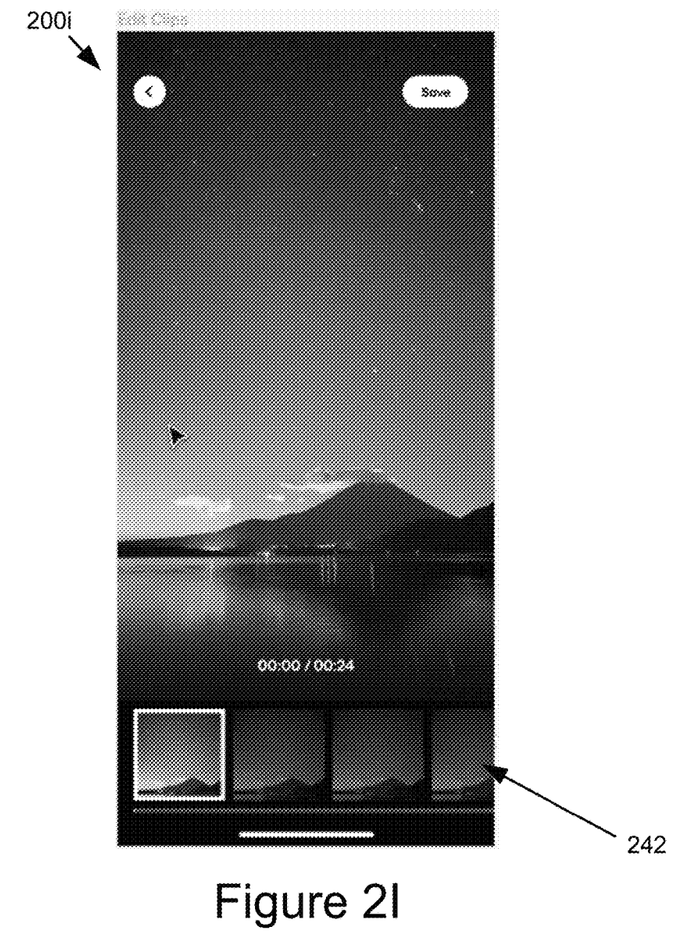
FIG. 2I illustrates an example graphical user interface displaying a set of generated media clip segments.

In some implementations, the set of individual media clips are displayed (e.g., in response to selecting "next" on the graphical user interface) on the graphical user interface in a timeline format as a horizontal row of previews of each of the set of individual media clips. For example, FIG. 2I illustrates an example graphical user interface 200i in which a row 242 of previews of the generated individual media clips. For example, a timeline of individual segments may be displayed as a horizontally scrollable row, a vertically scrollable column, a grid, or in another format.

Beneficially, the design application 390 may display the set of segments/individual media clips in a single timeline, for example, based on their relative start or end points in the certain media clip or timeline from which they are cut. For example, the set of segments may be displayed horizontally with horizontal dimensions on the graphical user interface based on their relative or their absolute length.

In some implementations, at 120, the design application 390 may receive user inputs interacting with graphical elements depicting the set of individual media clips on the graphical user interface. Each of the media clips may be selected to play their content or otherwise modify it. For example, the user input may include dragging the individual media clips across the graphical user interface (e.g., using a touch screen input) to change their order in the set/sequence, which may initially be based on their location in the timeline. For example, modifying the individual content clips may include, but is not limited to, rearranging an order of the set of individual media clips, modifying a filter applied to a certain one of the set of individual media clips, modifying a playback speed of a certain one of the set of individual media clips, modifying a crop level applied to a certain one of the set of individual media clips, applying one or more graphical overlays over a certain one of the set of individual media clips, and/or deleting certain clips, etc.

In some implementations, at 122, the design application 390 may generate a content item using the set of individual media clips and the one or more third user inputs. For example, the design application 390 may generate a single video, slide show, article, magazine, or content item including the set of modified content segments and based on their order. The design application 390 may provide the content item to be shared via an API of a social media platform, e-mail, text messaging, a specific application (e.g., another instance of the design application 390, a media publishing application 396, etc.), or another method.

In some implementations, the media publishing application 396 may receive a user input and accordingly export the result content item. In some instances, a user may select an option from a user interface provided by the media publishing application 396 to save the result content item to a data store, insert it into a document, upload it to a website, or post it to a social network page, etc.

As depicted in FIG. 3, the illustrated computing system 300 for performing operations described herein may include user device(s) 320a, 320b, and 320n (also referred to herein individually and/or collectively as 320), and management server(s) 398, which are electronically and communicatively coupled via the network 310 for interaction with one another, although other system configurations are possible including other devices, systems, and networks. For example, the computing system 300 may include any number of user devices 320, management servers 398, third-party servers (not shown) and other systems and devices. The user devices 320a . . . 320n, and their components, may be coupled to the network 310. The management server 398 and its components may also be coupled to the network 310. The user devices 320 and the management server 398 depicted in FIG. 3 only include one or more of the design application 390a, 390, and 390n and the media publishing application 396a, 396b, and 396n. In some instances, these applications implemented on these computing entities may interact with one another to collaboratively perform the functionalities described herein. In some implementations, the user devices 320 may include a smartphone, laptop, desktop computer, or other computing device.

The network 310 may include any number of networks and/or network types. For example, the network 310 may include one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The management server 398 may have data processing, storing, and communication capabilities, as discussed elsewhere herein. For example, the management server 398 may include one or more hardware servers, server arrays, storage devices and/or systems, etc. In some implementations, the management server 398 may include one or more virtual servers, which operate in a host server environment. As depicted, the management server 398 may include the design application 390, the media publishing application 396, etc., as discussed elsewhere herein. The management server 398 may also host other services such as a third-party application (not shown), which may be individual and/or incorporated into the services provided by the management server 398.

FIG. 4 illustrates a computing device 400 that can be implemented as the user device 320 or the management server 398, for example. As depicted, the computing device 400 may include a communication unit 402, a processor 404, a memory 406, database(s) 408, an input device 414, an output device 416, the design application 390, and the media publishing application 396, which may be communicatively coupled by a communication bus 410. The computing device 400 depicted in FIG. 4 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing device 400 may include various operating systems, sensors, additional processors, and other physical configurations. Although, for purposes of clarity, FIG. 4 only shows a single communication unit 402, processor 404, memory 406, etc. It should be understood that the computing device 400 may include a plurality of one or more of these components.

The processor 404 may execute software instructions by performing various input, logical, and/or mathematical operations. The processor 404 may have various computing architectures to method data signals including, for example, a complex instruction set computer (CISC) architecture, a reduced instruction set computer (RISC) architecture, and/or an architecture implementing a combination of instruction sets. The processor 404 may be physical and/or virtual, and may include a single core or plurality of processing units and/or cores. In some implementations, the processor 404 may be capable of generating and providing electronic display signals to a display device, supporting the display of images, capturing and transmitting images, performing complex tasks including various types of feature extraction and sampling, etc. In some implementations, the processor 404 may be coupled to the memory 406 via the bus 410 to access data and instructions therefrom and store data therein. The bus 410 may couple the processor 404 to the other components of the computing device 400 including, for example, the communication unit 402, the memory 406, the input device 414, the output device 416, and the database(s) 408.

The memory 406 may store and provide access to data to the other components of the computing device 400. The memory 406 may be included in a single computing device or a plurality of computing devices. In some implementations, the memory 406 may store instructions and/or data that may be executed by the processor 404. For example, the memory 406 may store an instance of the design application 390, the media publishing application 396, and/or their respective components, depending on the configuration. The memory 406 is also capable of storing other instructions and data, including, for example, an operating system, hardware drivers, other software applications, databases, etc. The memory 406 may be coupled to the bus 410 for communication with the processor 404 and the other components of the computing device 400.

The memory 406 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 404. In some implementations, the memory 406 may include one or more of volatile memory and non-volatile memory (e.g., RAM, ROM, hard disk, optical disk, etc.). It should be understood that the memory 406 may be a single device or may include multiple types of devices and configurations.

The bus 410 may include a communication bus for transferring data between components of a computing device or between computing devices, a network bus system including the network 310 or portions thereof, a processor mesh, a combination thereof, etc. In some implementations, the management server 398, the design application 390, the media publishing application 396, and various other components operating on the computing device 400 (operating systems, device drivers, etc.) may cooperate and communicate via a communication mechanism included in or implemented in association with the bus 410. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 402 may include one or more interface devices (I/F) for wired and wireless connectivity among the components of the system 300. For example, the communication unit 402 may include various types known connectivity and interface options. The communication unit 402 may be coupled to the other components of the computing device 400 via the bus 410. The communication unit 402 may be electronically communicatively coupled to the network 310 (e.g., wiredly, wirelessly, etc.). In some implementations, the communication unit 402 may link the processor 404 to the network 310, which may in turn be coupled to other processing systems. The communication unit 402 may provide other connections to the network 310 and to other entities of the computing system 300 using various standard communication protocols.

The input device 414 may include any device for inputting information into the computing device 400. In some implementations, the input device 414 may include one or more peripheral devices. For example, the input device 414 may include a sensor, a keyboard (e.g., a virtual keyboard), a pointing device (e.g., a virtual mouse device), a microphone for receiving user input via speech, an image/video capture device (e.g., camera), a touch-screen display integrated with the output device 416, etc.

The output device 416 may be any device capable of outputting information from the computing device 400. The output device 416 may include one or more of a speaker, a display (LCD, OLED, etc.), a haptic device, a touch-screen display, a light indicator, etc. In some implementations, the output device 416 may be a display that can display electronic content (e.g., images, videos, etc.) with different representation effects (e.g., rewind, overlaid animation, etc.). In some implementations, the computing device 400 may include a graphics adapter (not shown) for rendering and outputting the electronic content for presentation on the output device 416. The graphics adapter (not shown) may be a separate processing device including a separate processor and memory (not shown) or may be integrated with the processor 404 and the memory 406.

The database(s) 408 may be data store(s) for storing and providing access to data. The data stored by the database(s) 408 may be organized and queried using any type of data stored in the database(s) 408. The database(s) 408 may include file systems, databases, data tables, documents, or other organized collections of data. Examples of the types of data stored in the database(s) 408 may include user data, template data, content item data, etc.

The database(s) 408 may be included in the computing device 400 or in another computing system and/or storage system distinct from but coupled to or accessible by the computing device 400. The database(s) 408 may include one or more non-transitory computer-readable mediums for storing the data. In some implementations, the database(s) 408 may be incorporated with the memory 406 or may be distinct therefrom. In some implementations, the database(s) 408 may store data associated with a database management system (DBMS) operable on the computing device 400. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The components 400, 390, 396, and/or other components (e.g., 402, 404, 406, 408, 414, and/or 416), may be communicatively coupled by the bus 410 and/or the processor 404 to one another and/or to other components of the computing system 300. As discussed elsewhere herein, the design application 390 may include computer logic (e.g., software logic, hardware logic, etc.) executable by the processor 404 to provide functionalities for defining templates. The media publishing application 396 may include computer logic (e.g., software logic, hardware logic, etc.) executable by the processor 404 to provide functionalities for retrieving the media clips, segment, individual clips, images, content presentations, etc., publishing the content presentations, etc., editing and modifying the content items or performing other operations. In any of the implementations discussed above, the design application 390 and the media publishing application 396 may be adapted for cooperation and communication with the processor 404 and/or other components of the computing system 300.

It should be understood that the computing system 300 illustrated in FIG. 3 and the computing device 400 illustrated in FIG. 4 are representative of example systems and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Methods are described herein; however, it should be understood that the methods are provided by way of example, and that variations and combinations of these methods, as well as other methods, are contemplated. For example, in some implementations, at least a portion of one or more of the methods represent various elements of one or more larger methods and may be concatenated or various steps of these methods may be combined to produce other methods which are encompassed by the present disclosure. Additionally, it should be understood that various operations in the methods may in some cases be iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices can be coupled to the system either directly or through intervening I/O controllers. The data processing system may include an apparatus that may be specifically constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects may not be mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
    providing, by one or more processors, a graphical user interface for display on a client device, the graphical user interface including a time-specific graphical representation of a certain media clip, the certain media clip including a video;
    providing, by the one or more processors, a timeline graphical element on the graphical user interface, the timeline graphical element being located below a center of the time-specific graphical representation of the certain media clip, the timeline graphical element graphically representing a timeline including the certain media clip, the graphical user interface including a graphical selected point indicator located at a static position in the graphical user interface and indicating a selected point on the timeline of the certain media clip;
    receiving, by the one or more processors, one or more first user inputs on the graphical user interface moving the timeline graphical element and, in response to the one or more first user inputs, automatically updating the time-specific graphical representation of the certain media clip to correspond to the selected point on the timeline based on a position of the timeline graphical element on the graphical user interface;
    providing, by the one or more processors, one or more marking graphical elements proximate to the timeline graphical element, the one or more marking graphical elements being selectable to mark a start point or an end point of a segment of the certain media clip;
    receiving, by the one or more processors, one or more second user inputs indicating a user interaction with one or more of the timeline graphical element and the one or more marking graphical elements on the graphical user interface;
    updating, by the one or more processors, the timeline graphical element to graphically indicate a plurality of segments of the certain media clip based on the one or more second user inputs;
    determining, by the one or more processors, a start point and an end point of each of the plurality of segments of the certain media clip based on the one or more second user inputs;
    generating, by the one or more processors, a set of individual media clips based on the determined start point and the determined end point of each of the plurality of segments of the certain media clip, each of the set of individual media clips including a portion of the certain media clip;
    and
    generating, by the one or more processors, a content item using the set of individual media clips.

2. The method of claim 1, further comprising:
determining, by the one or more processors, a set of media clips associated with a user;
providing, by the one or more processors, graphical representations of the set of media clips on the graphical user interface displayed on the client device, the set of media clips including the certain media clip; and
in response to receiving a selection of a certain graphical representation of the certain media clip, adding the certain media clip to the timeline, the timeline including one or more media clips.

3. The method of claim 1, wherein:
the timeline includes the certain media clip;
the timeline graphical element graphically displays a plurality of previews of the certain media clip; and
the timeline graphical element is horizontally scrollable in response to the one or more second user inputs such that the graphical selected point indicator indicates varying points on the timeline graphical element.

4. The method of claim 3, wherein the one or more second user inputs include touch inputs into the client device, the touch inputs including a horizontal scrub of the timeline graphical element.

5. The method of claim 1, wherein the one or more marking graphical elements include a single graphical button that changes its operation based on context of the one or more second user inputs.

6. The method of claim 5, wherein the context includes:
a total duration of the plurality of segments of the certain media clip exceeding a threshold.

7. The method of claim 5, wherein the context incudes one or more of:
the one or more marking graphical elements having been selected to indicate a start point of a certain segment of the certain media clip; and
the one or more marking graphical elements having been selected to indicate an end point of the certain segment of the certain media clip.

8. The method of claim 5, wherein the change in operation of the one or more marking graphical elements includes one or more of:
a change of the one or more marking graphical elements from a start graphical element to a stop graphical element, the one or more marking graphical elements including the single graphical button; and
a change in a visual appearance of the one or more marking graphical elements.

9. The method of claim 1, wherein updating the timeline graphical element to graphically indicate the plurality of segments of the certain media clip based on the one or more second user inputs includes:
overlaying a transparent highlighted area over the timeline graphical element at points encompassing the start point and the end point of each of the plurality of segments of the certain media clip; and
outlining each of the transparent highlighted areas with a box.

10. The method of claim 1, wherein the set of individual media clips are displayed on the graphical user interface in a timeline format as a horizontal row of previews of each of the set of individual media clips.

11. The method of claim 1, further comprising:
receiving, by the one or more processors, one or more third user inputs interacting with graphical elements depicting the set of individual media clips on the graphical user interface, wherein the one or more third user inputs interacting with graphical elements depicting the set of individual media clips on the graphical user interface include one or more of:
rearranging an order of the set of individual media clips;
modifying a playback speed of a certain one of the set of individual media clips; and
applying one or more graphical overlays over the certain one of the set of individual media clips.

12. The method of claim 1, further comprising:
receiving, by the one or more processors, one or more third user inputs interacting with graphical elements depicting the set of individual media clips on the graphical user interface, wherein the one or more third user inputs interacting with graphical elements depicting the set of individual media clips on the graphical user interface include one or more of:
modifying a filter applied to a certain one of the set of individual media clips; and
modifying a crop level applied to the certain one of the set of individual media clips.

13. A system comprising:
a processor;
a graphical display displaying one or more graphical user interfaces; and
a non-transitory computer-accessible memory storing instructions that, when executed by the processor, cause the system to:
provide a graphical user interface for display on a client device, the graphical user interface including a time-specific graphical representation of a certain media clip, the certain media clip including a video;
provide a timeline graphical element on the graphical user interface, the timeline graphical element being located below a center of the time-specific graphical representation of the certain media clip, the timeline graphical element graphically representing a timeline including the certain media clip, the graphical user interface including a graphical selected point indicator located at a static position in the graphical user interface and indicating a selected point on the timeline of the certain media clip;
receive one or more first user inputs on the graphical user interface moving the timeline graphical element and, using the one or more first user inputs, automatically updating the time-specific graphical representation of the certain media clip to correspond to the selected point on the timeline based on a position of the timeline graphical element on the graphical user interface;
provide one or more marking graphical elements proximate to the timeline graphical element, the one or more marking graphical elements being selectable to mark a start point or an end point of a segment of the certain media clip;
receive one or more second user inputs indicating a user interaction with one or more of the timeline graphical element and the one or more marking graphical elements on the graphical user interface;
update the timeline graphical element to graphically indicate a plurality of segments of the certain media clip based on the one or more second user inputs;
determine a start point and an end point of each of the plurality of segments of the certain media clip based on the one or more second user inputs;
generate a set of individual media clips based on the determined start point and the determined end point of each of the plurality of segments of the certain media clip, each of the set of individual media clips including a portion of the certain media clip; and generate a content item using the set of individual media clips.

14. The system of claim 13, wherein:

the timeline includes the certain media clip;

the timeline graphical element graphically displays a plurality of previews of the certain media clip; and the timeline graphical element is horizontally scrollable in response to the one or more second user inputs such that the graphical selected point indicator indicates varying points on the timeline graphical element.

15. The system of claim 14, wherein the one or more second user inputs include touch inputs into the client device, the touch inputs including a horizontal scrub of the timeline graphical element.

16. The system of claim 13, wherein the one or more marking graphical elements include a graphical button that changes its operation based on context of the one or more second user inputs.

17. The system of claim 16, wherein the context incudes one or more of:

the graphical selected point indicator being at a beginning of the timeline;

the graphical selected point indicator being at an end of the timeline; and a total duration of the plurality of segments of the certain media clip exceeding a threshold.

18. The system of claim 16, wherein the context incudes one or more of:

the one or more marking graphical elements having been selected to indicate a start point of a certain segment of the certain media clip; and the one or more marking graphical elements having been selected to indicate an end point of the certain segment of the certain media clip.

19. The system of claim 16, wherein the change in operation of the one or more marking graphical elements includes one or more of:

a change of the one or more marking graphical elements from a start graphical element to a stop graphical element, the one or more marking graphical elements including a single graphical button; and a change in a visual appearance of the one or more marking graphical elements.

20. A method comprising:

providing, by one or more processors, a graphical user interface for display on a mobile computing device having a touchscreen display, the graphical user interface including a time-specific graphical representation of a certain media clip;

providing, by the one or more processors, a timeline graphical element on the graphical user interface, the timeline graphical element graphically representing a timeline including the certain media clip, the graphical user interface including a graphical selected point indicator located at a static position in the graphical user interface and indicating a selected point on the timeline of the certain media clip;

providing, by the one or more processors, a marking graphical element on the graphical user interface, the marking graphical element being selectable to record one or more of a start point and an end point of a segment of the certain media clip;

receiving, by the one or more processors, one or more first user inputs on the graphical user interface scrubbing the timeline graphical element horizontally;

receiving, by the one or more processors, one or more second user inputs indicating a user interaction with the marking graphical element;

determining, by the one or more processors, a start point and an end point of each of a plurality of segments of the timeline graphical element corresponding to the certain media clip based on the one or more first user inputs and the one or more second user inputs; and updating, by the one or more processors, the graphical user interface including the timeline graphical element to graphically indicate the plurality of segments of the certain media clip based on the one or more first user inputs and the one or more second user inputs.

* * * * *